United States Patent Office 3,661,947
Patented May 9, 1972

3,661,947
CARBONYL HALIDE CATALYST FOR α-BROMINATION OF ALIPHATIC ACIDS
Robert M. Thomas and Rastko I. Mamuzic, West Lafayette, Ind., assignors to Great Lakes Chemical Corporation, West Lafayette, Ind.
No Drawing. Filed Aug. 21, 1969, Ser. No. 852,111
Int. Cl. C07c 51/00; C07f 7/00
U.S. Cl. 260—408      8 Claims

ABSTRACT OF THE DISCLOSURE

Saturated aliphatic acids unsubstituted in the α-position are brominated in the alpha position by reacting the acid with elemental bromine in the presence of a carbonyl halide of the formula

wherein X is bromine or chlorine and R is bromine or chlorine.

---

This invention relates to the method of α-brominating aliphatic acids by a modification of the Hell-Volhard-Zelinsky reaction. More particularly, the invention relates to the use of a carbonyl halide as catalyst for effecting bromination of saturated aliphatic acids unsubstituted in the α-position and free of activating groups in the β-position.

BACKGROUND OF INVENTION AND PRIOR ART

The α-hydrogen of an aliphatic acid is active and can be replaced by bromine. In the original Hell-Volhard procedure [A. R. Surrey, Name Reactions in Organic Chemistry, pp. 94-95, Academic Press, N.Y. 1954], the acid is reacted with bromine in the presence of phosphorus. Later the Hell-Volhard-Zelinsky method [Gilman & Blatt, Organic Syntheses Coll. vol. 1, 2nd Ed. 115 (1941)], used phosphorous trichloride in place of phosphorus as the initiator. Sulfur has also been used (U.S. Pat. 2,043,670).

It has been theorized, Fieser & Fieser, pages 367-368, Advanced Organic Chemistry, Reinhold, New York, 1961, that the phosphorus or phosphorus halide reacts with the acid to first form the acid halide which is then converted to α-bromo substituted acid halide and then hydrolyzed with water to form the α-bromo acid. Sweet & Estes, J. Org. Chem., 21, 1426 (1956) applied this theory to practice by reacting the acid with thionyl chloride to form the acid chloride, brominating the acid chloride and hydrolyzing resultant product to form the α-bromo substituted acid.

The above methods suffer from the handicap of having the final product fouled with a catalyst which makes it difficult to purify the product. This purification problem becomes particularly acute when the long chain or fatty acids are being brominated. The catalyst contamination requires the product be washed thoroughly with an amount of water sufficient to remove the phosphorus or sulfur by-products and azeotropically distill the mixture with benzene to remove the water.

OBJECTS OF THE INVENTION

It is a general object of this invention to provide a novel process for brominating aliphatic acids by using a carbonyl halide as the bromination promoter.

A further object of this invention is to provide a novel method for the α-bromination of aliphatic acids wherein the product is free of contaminating catalysts.

An additional object of this invention is to provide a method for the bromination of aliphatic acids wherein the product has a high neutralization equivalent without extensive purification steps.

UTILITY

α-Bromo-aliphatic acids are important intermediates for the production of many organic compounds. The corresponding α-amino acids may be prepared by treating the acid with ammonia as described in U.S. Pat. 2,109,929. In addition some of the longer chain α-bromo acids may be used in rosin soldering flux as described in U.S. Pat. 2,715,084.

DESCRIPTION OF THE INVENTION

According to this invention, α-bromo-aliphatic acids are produced by the addition of bromine to a saturated aliphatic acid containing at least 5 carbon atoms and unsubstituted in the α-position and free of activating groups in the β-position, in the presence of a carbonyl halide of the formula

wherein X is bromine or chlorine and R is bromine or chlorine.

In the instant invention it was surprising to find that a small amount of a carbonyl halide, e.g., up to 20%, preferably between 3% to 15%, of the molar equivalent amount of acid being brominated provides high and often quantitative yields of the corresponding α-bromo acid, free of contaminative side products.

In general, the aliphatic acid is introduced into a reaction zone, the catalyst is added to the acid and dry bromine is then added to the mixture. The reaction is not instantaneous. The bromine is added fairly rapidly in one portion and then the reactants are heated until the reaction is completed. Residual bromine and HBr are stripped from the product and the product is washed with water to hydrolyze any remaining acyl halide. The product is then stripped again to a constant weight, giving the product.

REACTANTS AND CONDITIONS

Aliphatic acid

The aliphatic acids used in this invention are acids containing at least 5 carbon atoms, unsubstituted in the alpha-position and free of activating groups in the β-position. The acids can be unsubstituted or can contain other organic substitutions such as alkyl, nitro, sulfo, halogen, ether, hydroxy, acyloxy, carboxy, carbalkoxy, etc. Preferably, the carbon atom alpha to the carboxy group is the only bromine reactive site but other reactive sites can be present. When an additional reactive site is present the quantity of bromine should be adjusted commensurate with the number of such sites and the rates of the competitive reactions.

Acids which may be brominated by this invention include fatty acids of at least five carbon atoms of the formula $C_nH_{2n+1}$—COOH such as: valeric acid, caproic acid, enanthylic acid, caprylic acid, pelargonic acid, capric acid, undecylic acid, lauric acid, tridecoic acid, myristic acid, pentadecanoic acid, palmitic acid, margaric acid, stearic acid, nondecylic acid, arachidic acid, behenic acid, carnaubic acid, hyenic acid, carboceric acid, cerotic acid, lacceroic acid, melissic acid, montanic acid, psyllic acid, and in addition such polycarboxylic acids as succinic, glutaric, adipic, pimelic, suberic, azelaic, sebacic, undecanedioic, dodecanedioic, brassylic, thapsic, and further, mixed naturally occurring saturated fatty acids derived from fats and oils such as coconut, babassu, palm kernel, palm, olive, peanut, beef tallow, lard (leaf), and saturated cyclic carboxylic acids of 6-10 carbon atoms such as cyclopentyl-carboxylic acid, cyclohexyl-carboxylic acid, cyclopentylacetic acid, etc.

In the most preferred embodiment the acids are the fatty acids having from 10–25 carbon atoms and saturated, unsubstituted ω,ω-dicarboxylic acids having from 5–16 carbon atoms. These acids are commercially available and the commercial grade materials are used directly in the reaction without further purification.

Bromine

The bromine used in this invention is conventional, commercially available bromine, preferably anhydrous, so the carbonyl halide promoter is not hydrolyzed. At least a molar equivalent and preferably an excess of bromine, calculated on the acid, is used to insure the complete bromination of the acid. A molar ratio of bromine to acid of between 1.1:1 to 3:1 is preferred. The excess bromine can act as a solvent for the long chain fatty acids which are solids.

It will be apparent that when a dicarboxylic acid is being brominated, slightly less than twice the amount of bromine is required as when brominating the monocarboxylic acids, if complete, i.e., dibromination.

The temperature at which the bromine is added to acid is not critical. The bromine can be added at room temperature, at the reflux temperature of the bromine or any solvent used, or at the melting temperature of the acid when the acid is a solid. It is preferred to add the bromine at or slightly below the boiling point of bromine to keep down bromine loss by evaporation.

The rate of bromine addition is not critical. The bromine is usually added slowly in one portion.

Promoter

The reaction promoter is a carbonyl halide of the formula.

wherein X is chlorine or bromine and R is chlorine or bromine. Preferred are phosgene and carbonyl bromide.

The phosgene used is commercially available phosgene in tanks and is bubbled directly into the reaction mixture.

Carbonyl dibromide is prepared by adding sulfuric acid to molten carbon tetrabromide at a temperature in the range of 150–164° C. while simultaneously collecting the resultant distillate. The crude brown liquid carbonyl bromide, having a boiling point between 115–140° C., is used directly as the catalyst.

The promoter preferably is used in a molar amount of at least 3% the molar amount of acid being brominated. There is no upper limit to the amount of promoter which can be present but preferably not more than 20% and preferably less than 15% of the molar amount of acid is used. The most preferred catalyst is phosgene which is preferably used in a molar proportion of 3%–7%, most preferably about 5%, of the molar amount of acid.

Reaction time and temperature

The reaction is a slow one and it is necessary to subject the reaction mixture to a reaction period of several hours, preferably with heating. When the reaction is conducted in a solvent, the reaction is conducted at the reflux temperature of the solvent; when there is no solvent then the temperature is determined by the rate of bromine reflux. After bromine addition is completed, the temperature is gradually raised, e.g., to between 65° and 72° C., until almost all hydrogen bromide has evolved. The reaction is then continued, e.g., for an additional hour at a higher temperature. In the solventless system the additional hour is preferably at a temperature of at least 100° C. The ability to raise the temperature of the reaction mixture to 100° C. is an indication of the completeness of the reaction. The reaction time necessary for a complete reaction with the longer chain fatty acids is at least 6 hours, at a temperature of 65–72° C., usually between 7 and 10 hours.

Solvent

The reaction can be conducted with or without an inert organic solvent. The preferred solvent is carbon tetrachloride. As pointed out previously, excess bromine can act as a solvent for the reaction, the excess being removed by distillation after the reaction is complete.

The following examples are illustrative of the best mode contemplated by the inventors of carrying out the invention but are not to be construed as limiting.

EXAMPLES

In the following examples all melting points and freezing points are uncorrected. Neutralization equivalents were determined by titration of solutions of samples in ethanol with standard sodium hydroxide to a red phenolphthalein end point. The titration can be done potentiometrically.

The following examples were conducted in bromination equipment comprising a suitably sized three neck round bottom flask equipped with a magnetic stirrer, thermometer, dropping funnel and reflux condenser vented to an aqueous trap for the collection of hydrogen bromide. The free bromine in the aqueous trap was determined by titration of iodine with standard thiosulfate to a colorless starch end point. The hydrogen bromide in the aqueous trap was determined by titration with standard sodium hydroxide to a red phenolphthalein end point. These determinations are considered estimates because the results were dependent on the rapidity of the reaction and the standing time of the samples after absorption.

Example 1

284.5 grs. (1.00 mole) of stearic acid were dissolved in 89 ml. of carbon tetrachloride. The solution was warmed to 65° C. and 2.5 grams (0.013 mole) of freshly prepared carbonyl dibromide ($COBr_2$) were added to the reaction mixture. The reaction mixture was then warmed to reflux and 175.8 grams (1.10 moles) of bromine were added in two charges.

First, 1.05 moles of bromine were added over a three hour period at 84–107° C. and the reaction mixture refluxed 8 hours (with temperature gradually increasing to 99° C.). An additional 0.05 mole of bromine was then added at 99° C. and the reaction mixture was refluxed an additional 4 hours (with temperature increasing to 110° C.). After a total of 15 hours of reflux (including bromine addition period), the reaction mixture was orange and the reflux was colorless. Without any other workup, the reaction mixture was evaporated under reduced pressure on the rotary evaporator at 70° C. and the α-bromo-stearic acid analyzed.

Yield:
 Theory: 363.4 grams (on stearic acid)
 Actual: 361.3 grams, 99.5%
Freezing point: 53° C.
Neutralization equivalent: 357 (Theory=363.4)
Color: Straw
HBr Recovery: 96.4 grams, quantitative (Theory=80.9 g.)
Elemental bromine: 22.4% (Theory=22.0%)

Example 2

Following the procedure of Example 1, 569.0 grams (2.00 moles) of stearic acid were dissolved in 285 ml. of carbon tetrachloride at a temperature of 60° C. Then 5.0 ml. of carbonyl bromide was added and the reaction mixture was brought to reflux. 319.6 grams (2.00 moles) of bromine were then added dropwise, over a period of 2 hours. The reaction mixture was maintained at reflux for 23 additional hours, making a total of 25 hours at reflux (temperature ranging from 76–93° C.). The 25 hours of reflux was with interruptions at the end of each day, reflux being resumed the following day. After this period of time, no free bromine remained in the reaction mixture, judging from the lighter color of the mixture. The solution was dried to constant weight under reduced pressure on a rotary evaporator (requiring 8 hours at 80°) leaving α-bromostearic acid as a solid residue.

Yield:
　　Theory: 726.4 grams (on stearic acid)
　　Actual: 717.9 grams, 98.8%
Freezing point: 54°
Neutralization equivalent: 358 (Theory=363.4)
HBr recovery: Quantitative Example 3

Following the method of Example 1, 28.4 grams (0.10 mole) of stearic acid were dissolved in 100 ml. of carbon tetrachloride. The mixture was warmed to 76° C. and phosgene (gas) was introduced into the solution by means of a dip tube below the surface of the mixture. The phosgene was introduced in a 30 minute period from a flow meter at a rate of 5–6 on an F & P 085–1/16–08–4/36 flow meter. The amount of phosgene added was determined by the weight increase of the reaction pot. 16.0 grams (0.10 mole) of bromine were added to the reaction mixture in one portion over a 10-minute period causing the pot temperature to drop from 76° C. to 72.5° C.

The reaction mixture was then refluxed for 10 hours until all of the bromine had reacted (colorless reflux). The pot temperature during reflux increased steadily from 72.5° to 78° C. The reaction mixture was then stripped to constant weight on the rotary evaporator under reduced pressure and the α-bromostearic acid analyzed.

Yield:
　　Theory: 36.3 grams
　　Actual: 35.8 grams
Recovery: 98.6%
Freezing point: 53° C.
Neutralization equivalent: 355.2 (Theory=363.4)
HBr recovery: 5.9 grams, 73.1% (Theory=8.09 g.)

Example 4

142.2 grams (0.50 mole) of stearic acid were placed in the bromination equipment described above and melted. 4 grams (0.04 mole) of phosgene were then introduced into the molten acid in the manner described in Example 3. 135.1 grams (0.85 mole) of bromine were then added dropwise, over a 10 minute period. During bromine addition and for 6 hours afterwards, the pot temperature was kept at 65–70° C. During the seventh hour, an effort was made to keep the pot temperature at 100°. However, due to the presence of excess (unreacted) bromine, a maximum pot temperature of 85–88° was maintained. The reaction mixture was then stripped under reduced pressure at 80° to remove unreacted bromine and residual HBr. 100 grams of product was treated with 100 ml. of water to purify the product somewhat and the residual water removed by azeotropic distillation with benzene. The α-bromostearic acid was recovered quantitatively (100 grams) after the distillation.

Yield
　　Theory: 181.7 grams (on stearic acid)
　　Actual: 165.0 grams
Recovery: 90.8%
Melting point: 46–62°
Freezing point: 56°
Neutralization equivalent: 325 (Theory=363.4)
HBr recovery: 24.8 grams, 61.3% of theory (40.5 g.)

Example 5

The reaction of Example 4 was repeated using 116.8 grams (0.41 mole) of stearic acid, ca. 3 grams (0.03 mole) of phosgene, and 110.3 grams (0.69 mole) of bromine. After the addition of all the reactants, the mixture was then stirred for 6 hours at 70–72° C. At this point, a large excess of unreacted bromine was present (judging from the darkness of solution). The pot temperature could not be increased immediately to 100° C. because of the presence of excess bromine. The temperature was gradually increased from 72 to 100° C. in 1.5 hours, followed by a 1 hour period at 100° C. The total reaction time was 8.5 hours. The reaction mixture was then stripped under reduced pressure at 80° C. to remove excess bromine and then finally stripped on a rotary evaporator to constant weight at a maximum temperature of 80° C. at 18 mm. Hg vacuum (from water aspirator).

Yield:
　　Theory: 149.2 grams (on stearic acid)
　　Actual: 148.5 grams
Recovery: 99.5%
Melting point: 41–47°
Freezing point: 43°
Neutralization equivalent: 363 (Theory=363.4)
Color: Pale Yellow
HBr recovery: Quantitative Example 6

The reaction of Example 4 was repeated using 205.1 grams (0.8 mole) palmitic acid, 3.0 grams (0.03 mole) phosgene and 217.33 grams (1.36 moles) bromine. The bromine was added in one portion and the reaction mixture was then stirred and heated to 70–72° C. for 6 hours. The temperature was increased to 100° C. as rapidly as possible (5.5 hours). The reaction mixture was then heated at 100° C. for 1 hour.

Excess bromine and residual HBr were evaporated on rotary evaporator under reduced pressure (aspirator) at 100° C. Weight loss during evaporation amout to 57.1 g. The product, alpha-bromopalmitic acid, was obtained as pale yellow solid.

Yield:
　　Calc.: 268.2 g. (calc. on palmitic acid)
　　Found: 265.7 g., 99.1%
Melting point:
　　Lit.: 52°
　　Found: 32–38°
Color: Pale yellow
Neutral Equiv.:
　　Calc.: 335.3
　　Found: 335.1

Example 7

The reaction of Example 4 was repeated using 94.1 grams (0.5 mole) azelaic acid, 1.1 grams (0.012 mole) phosgene and 212.6 grams (1.33 moles) bromine. The acid melted at 106.5° C. The addition of phosgene caused the temperature to rise to 120–125° C. The reaction mixture was cooled to 50° C. and the bromide added slowly in one portion. The reaction mixture was the stirred and heated to 70–72° C. for 6 hours. Pot temperature was increased to 100° C. as fast as possible (0.5 hour), and the reaction mixture was kept at 100° C. for 1 hour.

Excess bromine and residual HBr were evaporated on a rotary evaporator under reduced pressure (aspirator) at 100° C. Weight loss during evaporation was 16.1 g. Weight increase of the trap (HBr+some Br$_2$) amounted to 113.1 g. The product, alpha, alpha'-dibromoazelaic acid, was obtained as an orange-light brown viscous oil, which started to crystallize after standing at room temperature for 24 hours. It completely solidified in 2 weeks.

Yield:
　　Calc.: 173.0 g. (calc. on azelaic acid)
　　Found: 172.5 g., 99.8%
Color: Pale yellow
Neutral Equiv.:
　　Calc.: 170.2
　　Found: 172.7

The process of this invention produces a very pure product in close to quantitative yields. Although the phosphorous trihalide promoted process of the prior art also produces high yields, it is difficult to remove promoter and by-products. The present process, particularly when using phosgene, produces cleaner products which are easily purified. The process of this invention is easily adaptable to an industrial scale bromination of a broad range of acids and the scope of the invention is not to be limited except by the claims which follow.

We claim:

1. In a process for brominating a saturated aliphatic acid with bromine, said acid being unsubstituted in the α-position and being free of activating groups in the β-position and being selected from the group consisting of fatty acids of 5 to 25 carbon atoms, ω,ω-dicarboxylic acids of 5 to 16 carbon atoms, and saturated cyclic carboxylic acids of 6–10 carbon atoms, the improvement which comprises brominating said acid with bromine in the presence of up to 0.2 molar equivalent, calculated on the acid, of a halogenated carbonyl compound of the formula

wherein X is bromine or chlorine and R is bromine or chlorine.

2. A process according to claim 1 wherein the halogenated carbonyl compound is phosgene.

3. A process according to claim 1 wherein the acid is a fatty acid having at least 10 carbon atoms.

4. A process according to claim 2 wherein the acid is an ω,ω-dicarboxylic acid having from 5 to 16 carbon atoms.

5. A process according to claim 1 wherein the molar ratio of bromine to acid is greater than one.

6. A process according to claim 1 wherein the halogenated carbonyl compound is used in an amount of from 3% to 15% of the molar amount of acid.

7. A process according to claim 1 wherein the acid is a fatty acid of at least 10 carbon atoms, the molar ratio of bromine to acid is greater than one, and the halogenated carbonyl compound is phosgene, which is used in a molar amount of from 3% to 15% the molar amount of acid.

8. A process according to claim 1 wherein the acid is an ω,ω-dicarboxylic acid having from 5 to 16 carbon atoms, the molar ratio of bromine to acid is greater than one, and the halogenated carbonyl compound is phosgene, which is used in a molar amount of from 3% to 15% the molar amount of acid.

References Cited

UNITED STATES PATENTS

| | | | |
|---|---|---|---|
| 2,240,275 | 4/1941 | Whitmore et al. | 260—539 |
| 2,876,255 | 3/1959 | Johnston | 260—539 |

FOREIGN PATENTS

| | | | |
|---|---|---|---|
| 1,048,902 | | Germany | 260—537 |

LORRAINE A. WEINBERGER, Primary Examiner

V. GARNER, Assistant Examiner

U.S. Cl. X.R.

260—399, 404, 468 R, 485 H, 514 R, 535 H, 537 S, 539 R